United States Patent [19] [11] Patent Number: 4,538,262
Sinniger et al. [45] Date of Patent: Aug. 27, 1985

[54] MULTIPLEX BUS SYSTEM FOR CONTROLLING THE TRANSMISSION OF DATA BETWEEN A MASTER CONTROL UNIT AND A PLURALITY OF REMOTELY LOCATED RECEIVER-TRANSMITTER UNITS

[75] Inventors: Joseph O. Sinniger, Pennington; Richard M. Peterson, W. Windsor Township, Mercer County, both of N.J.

[73] Assignee: RCA Corporation, Princeton, N.J.
[21] Appl. No.: 520,122
[22] Filed: Aug. 3, 1983
[51] Int. Cl.³ .......................... H04J 3/06; H04J 3/02
[52] U.S. Cl. .............................. 370/85; 370/100; 307/10 R
[58] Field of Search ................ 370/100, 85; 307/10 R

[56] References Cited

U.S. PATENT DOCUMENTS

| 3,564,280 | 2/1971 | Sognefest et al. | 307/155 |
|---|---|---|---|
| 3,648,057 | 3/1972 | Sognefest et al. | 307/10 R |
| 3,651,454 | 3/1972 | Venema et al. | 340/52 F |
| 3,665,384 | 5/1972 | Ives | 340/52 R |
| 3,683,197 | 8/1972 | Ives | 340/10 R |
| 3,739,185 | 6/1973 | Shimizu et al. | 307/10 R |
| 3,819,949 | 6/1974 | Ueda et al. | 307/10 R |
| 3,821,559 | 6/1974 | Ueda et al. | 307/10 R |
| 3,846,639 | 11/1974 | Ueda et al. | 307/9 |
| 3,864,578 | 2/1975 | Lackey | 307/10 R |
| 3,891,965 | 6/1975 | Schroeder | 340/52 F |
| 4,220,822 | 9/1980 | Kawai et al. | 370/85 |
| 4,227,181 | 10/1980 | Brittain | 307/10 R |
| 4,232,231 | 11/1980 | Reed | 307/10 R |
| 4,293,947 | 10/1981 | Brittain | 370/85 |
| 4,355,385 | 10/1982 | Hampshire et al. | 370/85 |
| 4,370,561 | 1/1983 | Briggs | 307/9 |
| 4,371,925 | 2/1983 | Carberry et al. | 370/85 |

FOREIGN PATENT DOCUMENTS

WO83/03910 4/1982 PCT Int'l Appl. .

OTHER PUBLICATIONS

Multiprocessor Implementation of the Logic Function of a Multiplexed Wiring System for Automotives, IEE Proc., vol. 129, Pt. E, No. 6, Nov. 1982, pp. 223-228.
Multiplex Systems for Automobiles, by W. A. Rogers et al., General Motors, Warren, Mich., Convergence 80, 30th Annual IEEE VTS Conf. on Transportation Electronics, Sep. 15-17, 1980, Dearborn, Mich., (Also IEEE 80 CH 1601-4, SAE SP-90 Session B5, Paper 6 with added pp. 14G to 34G from an unreported conference.).
The following articles taken from the IEE Second International Conference on Automotive Electronics, Oct. 29-Nov. 2, 1979, London, published as P84 by SAE.
Integrated Timer Controller for Automotive Electrical System, by A. Ueda et al., Mitsubishi Electric Corp., Japan, pp. 49-53.
On Board Control and Monitoring Systems for Automotive Vehicles, by E. Zuckmantel, Westfälische Metall Industrie KG-Hueck & Co., Lippstadt, Germany, pp. 253-257.
Automotive "Signalbus" Multiplex Wiring System, by R. Foerste, VDO Adolf Schindling AG, Research and Development Center, Federal Republic of Germany, pp. 263-267.
A Multiplexed Wiring System for Cars and Its Electronics, by J. R. Massoubre et al., Precision Mechanique Labinal, France, pp. 268-272.
Electronic Multiplexing for Vehicles, by M. J. Hampshire et al., University of Salford, UK, Ward & Goldstone Ltd., UK, pp. 273-277.

Primary Examiner—Douglas W. Olms
Assistant Examiner—Curtis A. Kuntz
Attorney, Agent, or Firm—Joseph S. Tripoli; Robert L. Troike; Raymond E. Smiley

[57] ABSTRACT

A multiplex bus system comprises a master control unit (MCU) connected to at least one receiver-transmit unit (RTU) by a data bus. The MCU transmits to the RTU a message comprising a synchronization pulse of known duration and successive time spaced timing signals separated by time duration T marking the boundaries of data bits to be transmitted from the RTU to the MCU. The RTU includes a clock pulse source which utilizes the synchronization pulse to determine the frequency of the clock pulse source in P pulses per duration T. The value P is used in conjunction with the timing signals to create properly timed data determining signals in the data bits.

17 Claims, 8 Drawing Figures

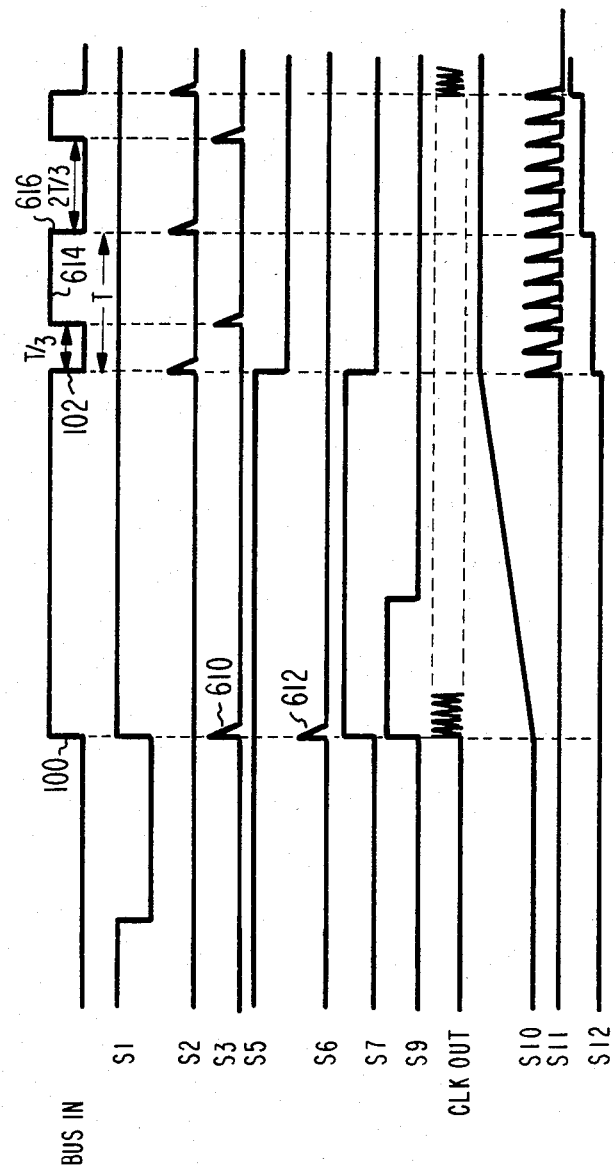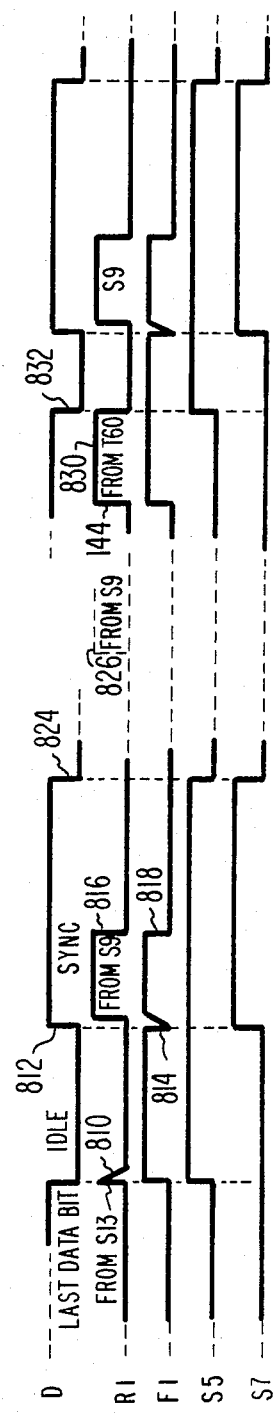
Fig. 6
Fig. 8

MULTIPLEX BUS SYSTEM FOR CONTROLLING THE TRANSMISSION OF DATA BETWEEN A MASTER CONTROL UNIT AND A PLURALITY OF REMOTELY LOCATED RECEIVER-TRANSMITTER UNITS

This invention relates to a multiplex bus system and more particularly to such a system which is of the "spoke" type as opposed to the "ring" type.

BACKGROUND OF THE INVENTION

There are functionally at least two types of multiplex bus systems. One is a ring system in which various signal transmitters and signal receivers are connected to a single bus functionally arranged in the shape of ring. In succession each transmitter obtains a turn to transmit to a selected receiver. An example of such a system is U.S. Pat. No. 4,370,561 issued Jan. 25, 1983 to G. R. Briggs and assigned to the common assignee.

Another multiplex bus system is a spoke system in which a master control unit (MCU) is connected by a plurality of buses to a greater plurality of signal transmitters and receivers. In such a system, in turn each transmitter transmits its message to the MCU. Likewise the MCU transmits messages to the various receivers in turn.

In practice a plurality of receivers and transmitters are often combined in a common receiver-transmitter unit (RTU). In such a system the MCU sends a message previously received from a first RTU to the receiver of a second RTU and then receives a message from the second RTU's transmitter. In such systems, timing within the RTU is very important so that signals received by the RTU are properly interpreted within it and signals generated by the RTU are transmitted at the proper times to the MCU. Otherwise, erroneous actions with serious consequences could occur. As an example in a multiplex bus system used in an automobile, a signal transmitted by a horn switch connected to one RTU to the MCU and then to the horn by another RTU if subjected to improper timing could result in the horn not blowing and instead the head lights being turned off, an obviously intolerable situation.

In prior art systems complex and expensive timing circuits often employing crystal oscillators are employed in the RTU to insure that the timing system is held to close tolerances.

SUMMARY OF THE INVENTION

In accordance with a preferred embodiment of the present invention a multiplex bus system comprises in combination a master control unit (MCU) which includes a first clock source and at least one receiver-transmit unit (RTU) including a second clock source. A bus means connects the MCU and RTU for facilitating the transmission of information bearing signals therebetween. The MCU transmits signals via the bus means to the RTU in the form of messages, each message comprising a sync pulse of known duration XT and a plurality of data bits of known duration T. Each message also includes a portion for the transmission of data from the RTU to the MCU. The MCU includes means utilizing the first clock source for determining the durations XT and T. The RTU includes means responsive to the sync signal and to the second clock source for producing a signal representing the duration T as a function of the second clock source frequency. The signal representing the duration T thereafter clocks the data bits contained in the message into the RTU.

BRIEF DESCRIPTION OF THE DRAWING

FIGS. 5–8 are sets of waveforms useful in understanding the operation of the multiplex bus system.

DETAILED DESCRIPTION OF THE PREFERRED EMBODIMENT

In the description which follows where quantities or time periods or frequencies are specified they are by way of example only and not intended as a limitation.

Figure 1:
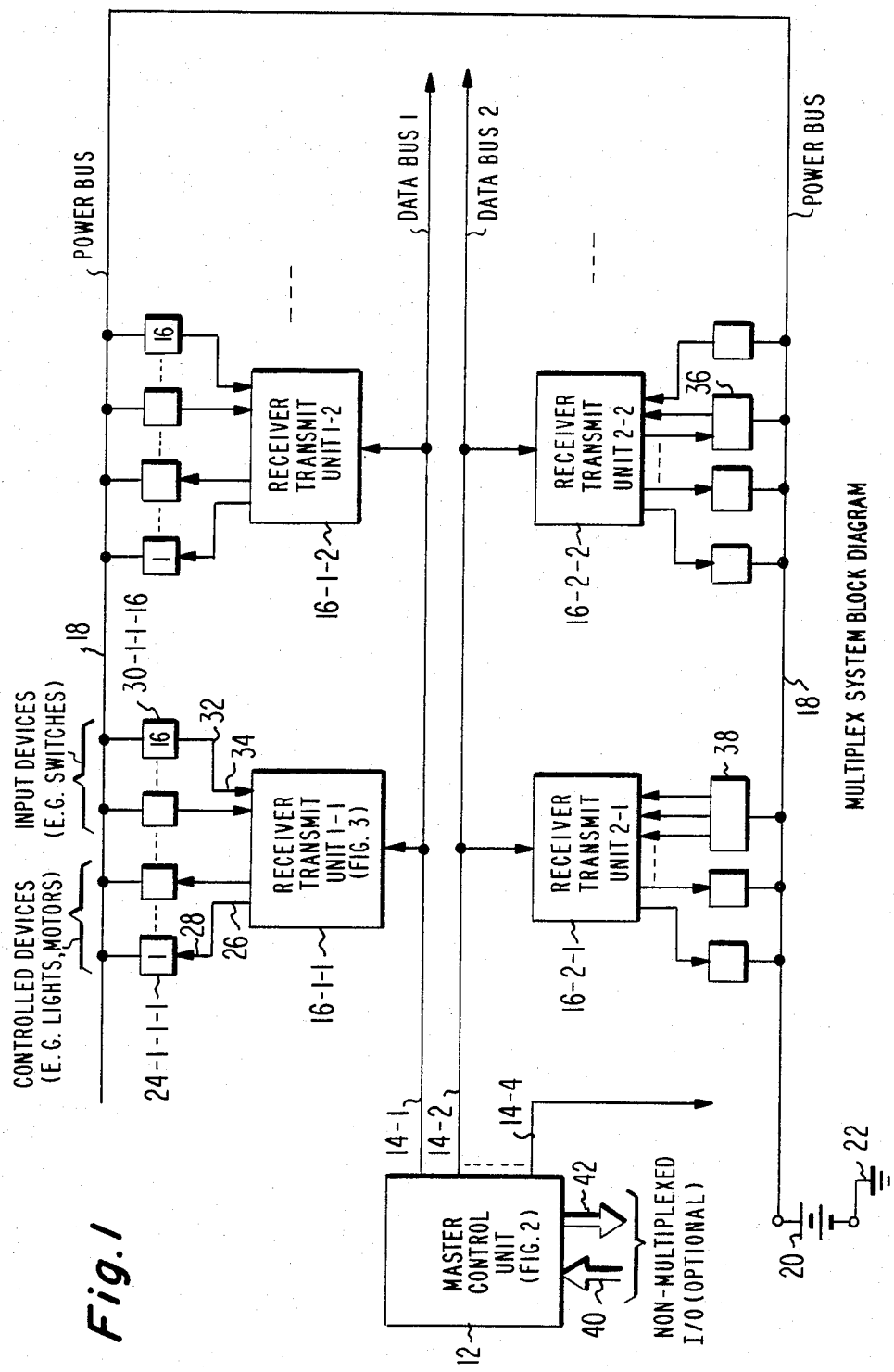
FIG. 1 is an overall multiplex system diagram in electrical block form in accordance with a preferred embodiment of the invention.

With respect to FIG. 1, a multiplex bus system in accordance with the invention comprises a master control unit (MCU) 12, a power bus 18, a plurality of data buses—three 14-1, 14-2, and 14-4 being illustrated—and, coupled to each data bus, a plurality of receiver-transmitter units (RTU)—four, 16-1-1, 16-1-2, 16-2-1, and 16-2-2, being illustrated. In an exemplary system there are four data buses each connected to 1 to 16 RTU's. An energy source such as a vehicle battery 20 is connected between power bus 18 and system ground bus 22. In the case of an automotive multiplex bus system the increased use of nonelectric conducting materials (e.g., plastic) in auto bodies may dictate that a separate ground wire be added in addition to power bus 18 to provide a complete current path for battery 22.

It will be understood that, although not illustrated, operating power typically from power bus 18 and ground bus 22 must be supplied to each RTU 16 and MCU 12. As will be described in further detail hereinafter in connection with a description of FIG. 3, each RTU may be arranged to control a plurality X of controlled devices such as lights, motors, and relays and receive signals from a plurality Y of input devices such as switches and sensors where the maximum total of X+Y is fixed at 16 for example. An exemplary RTU 16 (when an RTU in general is being referred to it will simply be referred to with the legend 16 not followed by any dashed numbers) can be arranged to accept signals from 4, 8, 12, or 16 input devices and arranged to control 12, 8, 4, or 0 controlled devices with the total being 16.

An exemplary controlled device is 24-1-1-1 connected to RTU 16-1-1 by a conductor 26 having an arrow 28 pointing into it from the RTU and an exemplary input device is 30-1-1-16 connected to RTU 16-1-1 by a conductor 32 with an arrow 34 pointing toward the RTU. A device may be both an input device and a controlled device as exemplified by device 36 connected to RTU 16-2-2. An exemplary device might be a headlight as a controlled device combined with a headlight illumination sensor being an input device. Another device such as 38 may require multiple inputs to its associated RTU. An example of such a device is a dashboard dimmer switch which may require a number of different inputs to indicate different degrees of dimming or a gas tank sending unit which generates a multibit signal the value of which depends on the amount of gas in the gas tank. MCU 12 also contains provisions illustrated by input arrow 40 and output arrow 42 for a direct connection to other input and controlled devices not illustrated.

Figure 2:
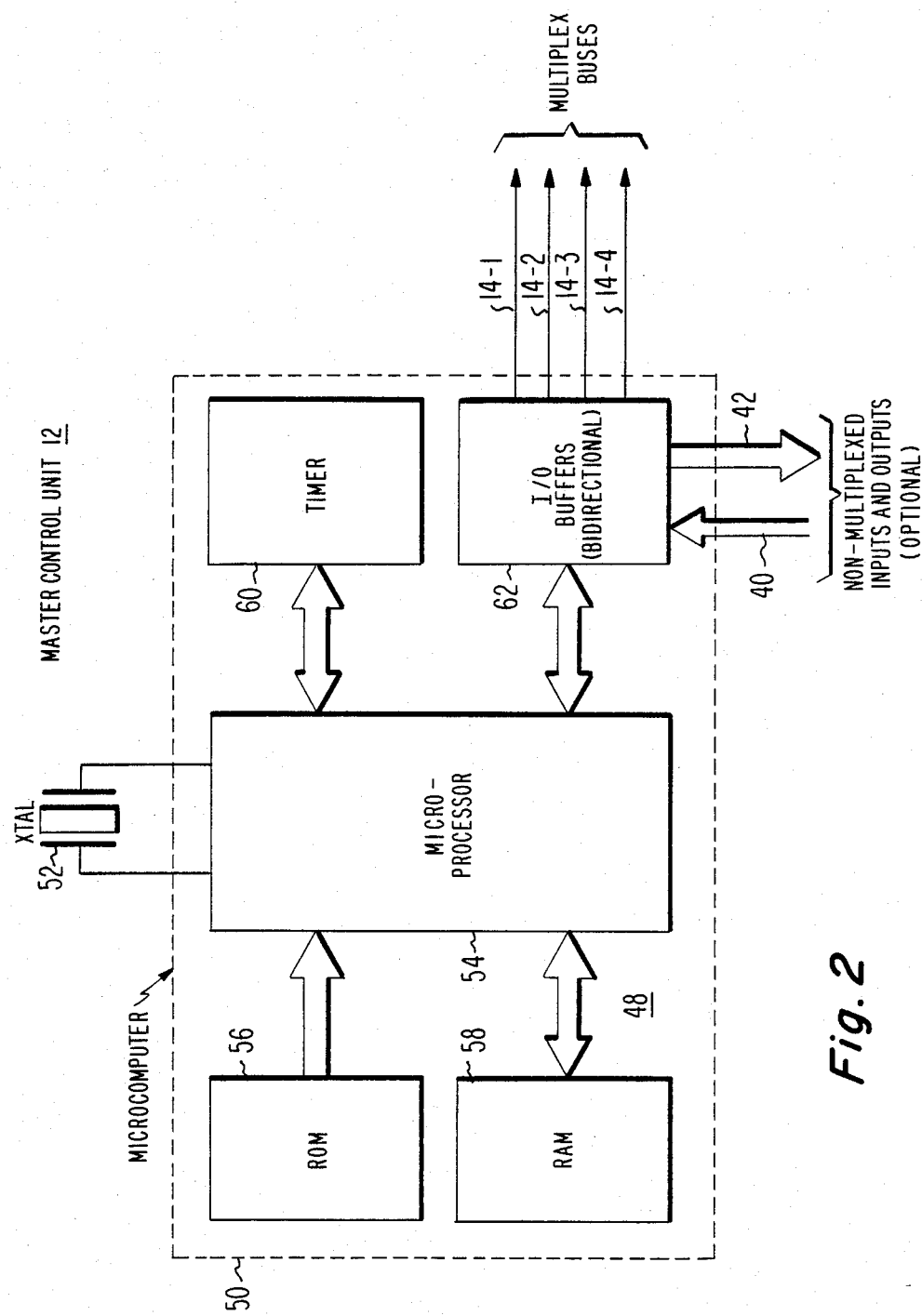
FIG. 2 is a diagram in electrical block form of a master control unit (MCU) which is part of the system of FIG. 1.

MCU 12 is illustrated in greater detail in FIG. 2 to which attention is now directed. MCU 12 comprises substantially a microcomputer 48 within dashed block 50 plus an accurate clock source such as a crystal oscillator 52 which may operate for example at 5 Mhz. Microcomputer 48 is typically a commercially available product sold by Motorola Semiconductor Corporation as model No. 146805G2. Microcomputer 48 comprises a microprocessor 54 to which are connected a read only memory (ROM) 56 of 2106 bytes capacity, a random access memory (RAM) 58 of 112 bytes capacity, a timer 60 and bidirectional input/output (I/O) ports 62. Timer 60 receives signals from oscillator 52 via microprocessor 54 and provides submultiple frequency timing signals required to operate microprocessor 54. In the exemplary microprocessor, ports 62 provide four 8 bit I/O ports. Four of the 8 bits for each port are for data and the other four bits are individually programmable from microprocessor 54 as to whether an associated data bit is an input bit or an output bit.

Thus, only one 8-bit port is used for the four multiplex data buses 14-1, 14-2, 14-3, and 14-4. The other three ports functionally illustrated by arrows 40 and 42 are for nonmultiplexed inputs and outputs respectively. Examples in an automotive setting are the ignition switch and key-pad door unlock switches as input devices and those things which the ignition switch is connected to and the door unlock solenoid as controlled devices. These devices might be chosen because of their need to be operational at all times irrespective of possible failures in RTU's.

All ports are tristate in that they can sink current, source current, or operate in a high impedance state, although, for the multiplex bus system, the high impedence state is not a normal condition and would only occur in a failure mode. It will be understood that any or all ports may connect to buffers (not shown) which are, in turn, connected to the input and output lines. The purpose of the buffers is to provide for any voltage offset between microcomputer 48 and any devices to which it is connected and to provide more current handling capability than that of which the microcomputer 48 is capable. The purpose of ROM 56 is to store the program which operates microprocessor 54. The purpose of RAM 58 is to store the data received from I/O 62 from such circuits as RTU 16 and to provide temporary storage as required for program operation.

Figure 3:
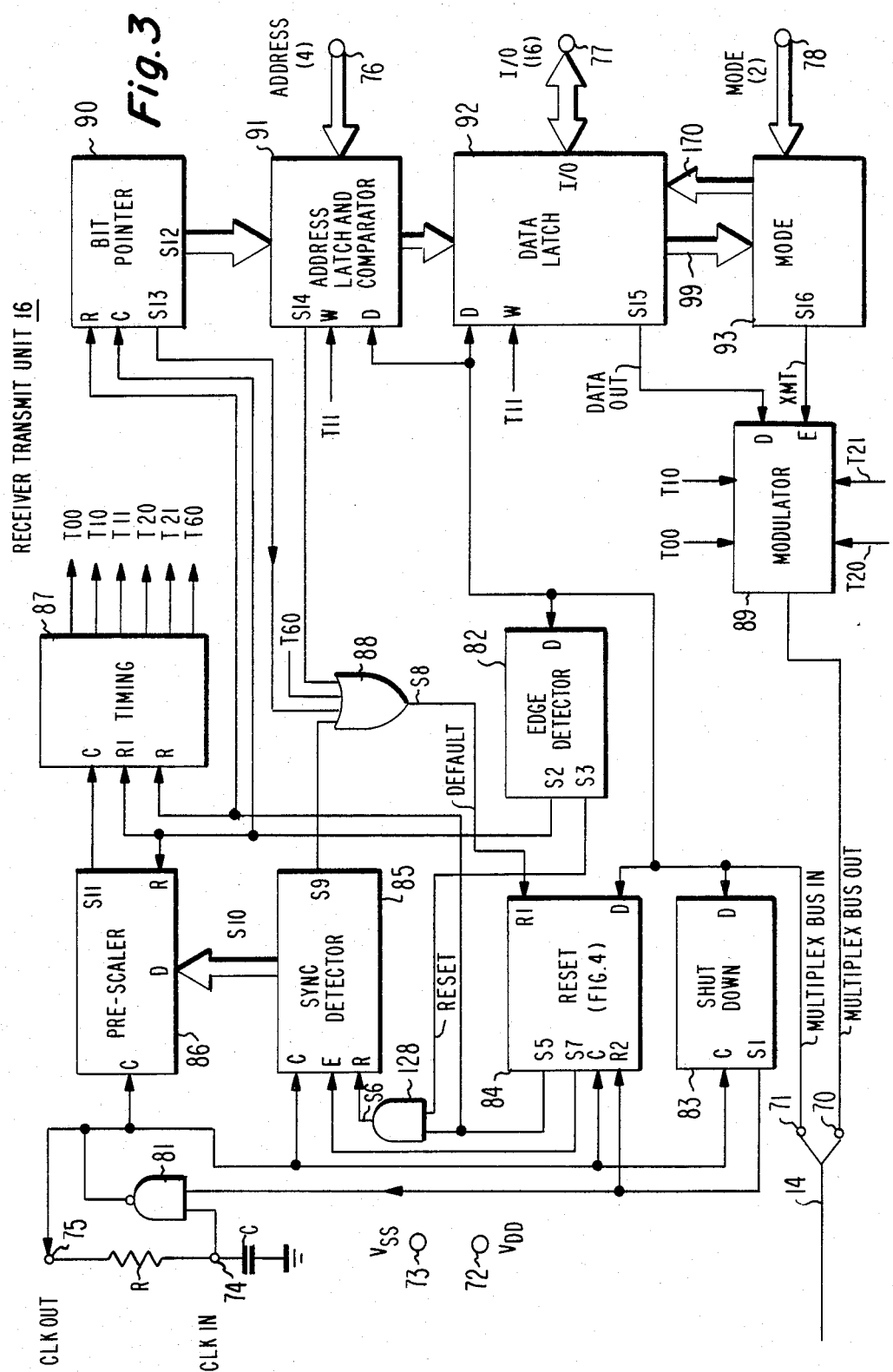
FIG. 3 is a diagram in electrical block and logic form of a receiver-transmitter unit (RTU) which is part of the system of FIG. 1.

RTU 16 is illustrated in greater detail in FIG. 3 to which attention is now directed. RTU 16 is typically built on one integrated circuit chip and connected to associated circuitry by 28 pins illustrated as large circles in FIG. 3 and hereinafter referred to as pins. Two 70 and 71, are externally connected together to a multiplex data bus such as 14-1, FIG. 1. Two, 72 and 73, are connected to receive bias voltage from power bus 18 and ground bus 22, FIG. 1. Two, 74 and 75 are connected to means for determining a clock source frequency. The clock source frequency determining means may be as simple as the R-C network illustrated producing a nominal 96 kHz clock rate but which may range over an 8:1 ratio from 48 kHz to 384 kHz while still providing for proper operation.

Four pins 76 determine the address of each RTU on a given multiplex data bus of busses 14-1 through 14-4 (FIG. 1). These four pins are simply wired in any desired combination to power bus 18 or ground bus 22 to provide an address for each RTU. Since there are four pins there are 16 ($2^4$) uniquely identifiable RTUs. Sixteen pins 77 are for data from input devices and to controlled devices (not shown). Finally, two more pins 78 are for mode control. The purpose of mode control is to determine which of the I/O pins 77 are connected to input lines and which are connected to output lines. The pins 78 are connected in any desired combination to power bus 18 and ground bus 22 to provide for any one of four combinations of input/output lines as follows: 16 input lines, 0 output lines, or 12 input lines, 4 output lines, or 8 input lines, 8 output lines, or 4 input lines, 12 output lines.

Within RTU 16 a NAND gate 81 is coupled at one of its inputs to pin 74 and connected at its output to pin 75. Input multiplex data bus from pin 71 is connected to the D (data) inputs of an edge detector circuit 82, a shutdown circuit 83 and a reset circuit 84 as well as to the D inputs of address latch circuit 91 and data latch circuit 92. Although the nature of the signals on the bus at pin 71 will be described in more detail hereinafter, the signal is a binary signal involving relatively low voltage portions and relatively high voltage portions and most of the circuitry in RTU 16 is concerned with acting in some way upon transitions of the signal in one or the other sense. The low level portions will be hereinafter referred to as LL 0 for logic level 0 and the high level portions will be referred to as LL 1 for logic level 1. The transitions will be referred to as positive going transitions (PGT) marking a change from low to high voltage or negative going transitions (NGT) marking a change from high to low voltage. It will be understood that the stated relative voltage levels, logic values and stated direction of change of voltage levels are merely exemplary and not intended to be limiting.

Edge detector 82 produces at its S2 output an LL 1 pulse upon detection at its D input of an NGT and produces an LL 1 pulse at its S3 output upon detection at its D input of a PGT. The S3 output of detector 82 is connected to one input of AND gate 128. The S2 output of detector 82 is connected to the reset (R) input of a prescaler circuit 86, the R1 input of a timing circuit 87 and to the clock (C) input of a bit pointer circuit 90. The clock output pin 75 is connected to the C inputs of each of prescaler circuit 86, sync (synchronization) detector 85, reset circuit 84 and shutdown circuit 83. The S1 output of shutdown circuit 83 is connected as the second input of NAND gate 81 and to the R2 input of reset circuit 84. The S5 output from reset circuit 84, which is a general reset signal, is connected to a second input of AND gate 128, to the R input of timing circuit 87 and to the R input of bit pointer circuit 90. The output from AND gate 128, labeled S6, is connected to the R input of sync detector 85. The S7 output from reset circuit 84 is connected to the enable (E) input of sync detector 85. Output S10 of sync detector 85 is connected to the D input of prescaler 86, the large arrow indicating a multiconductor connection.

OR gate 88 produces a default signal at its output S8 which is connected to the R1 input of reset circuit 84. OR gate 88 receives inputs from the S9 output of sync detector 85, the S13 output of bit pointer 90, the S14 output from address latch 91, and a timing output T60 from timing circuit 87.

Timing circuit 87 receives master timing information from output S11 of prescaler circuit 86 and produces time spaced output pulses on its various output lines T00, T10, T11, T20, and T21 as well as on the aforementioned line T60. The outputs T00, T10, T20, and T21 go to respectively marked inputs of a modulator circuit 89. The remaining timing signal T11 is connected to the write strobe (W) inputs of each of address latch 91 and data latch 92. The bit pointer 90 produces signals on its output lines S12 (again a large arrow indicates a multiconductor connection) to indicate which of 20 successive input bits to be described hereinafter is presently being received on multiplex bus pin 71. Those outputs S12 are connected to each of address latch 91, data latch 92, and mode select circuit 93.

The nature of the signal received at pin 71 will be described in greater detail hereinafter but it contains typically 20 bits of information. The first four bits relate to an address and are loaded into the four respective storage locations in address latch 91 under control of output S12. The next 16 bits of information pertain to data and are loaded into the 16 respective storage locations in data latch 92 under control of the output signal at output S12 of bit pointer 90. The output S15 of data latch 92 is connected to the D input of modulator 89 while the S16 output of mode circuit 93 is connected to the E input of modulator 89. The output of modulator 89 is connected to the multiplex data bus at pin 70.

Figure 5:
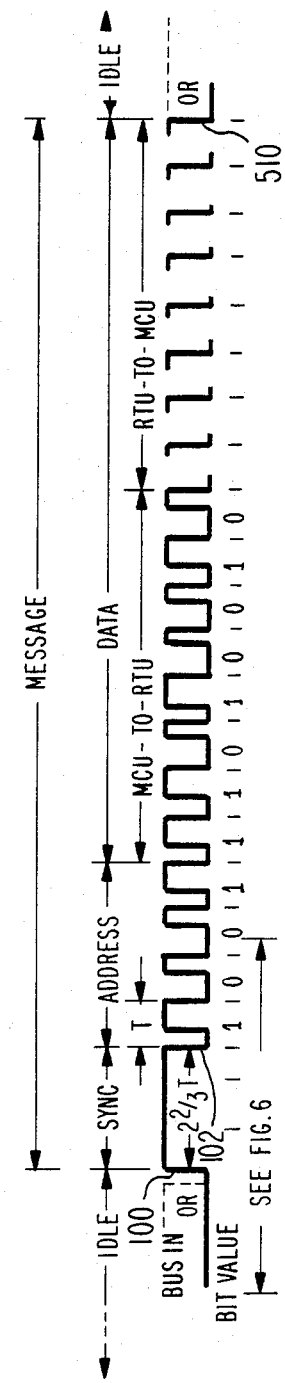

Before describing what is in the various blocks of FIG. 3, reference is made to the waveform of FIG. 5 which shows the character of a typical signal received at pin 71 from RTU 12 (FIG. 2). The typical signal consists of a series of messages (one shown) separated by Idle periods of varying lengths. The Idle period can be at a relatively high voltage level or a relatively low voltage level but is marked by the absence of a PGT or NGT. Each message consists of a sync pulse of time duration X·T where, for example $X=2\frac{2}{3}$, followed by four address bits each of time duration T, followed by 16 data bits each of time duration T, where T is a unit of time and in an exemplary operating system is one millisecond. In any case, T is accurately fixed in time by crystal 52, FIG. 2. The sync pulse is marked by a PGT 100 and $2\frac{2}{3}$ T later an NGT 102. If an Idle is at a high voltage level an NGT must precede PGT 100 but it can occur just before PGT 100. The data bits are divided into two groups, data bits sent from the MCU 12 to the RTU 16, if any, and data bits sent from the RTU 16 to the MCU 12. In FIG. 5, eight of each are shown.

Figure 4:
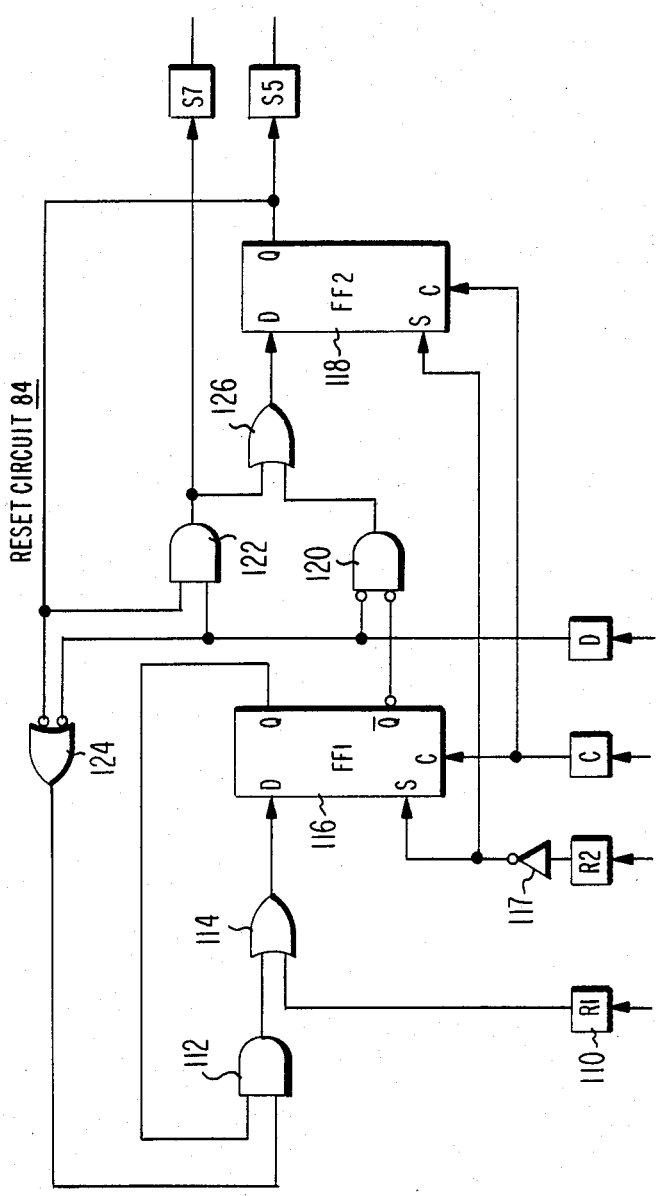
FIG. 4 is a diagram in logic form of the reset block of the RTU.

Returning to FIG. 3, shutdown circuit 83 consists of a conventional counter (not shown) for counting clock pulses from clock out pin 75 as applied to the C input and a conventional flip-flop (not shown) which becomes set when a given count is reached in the counter, typically an overflow. The counter and flip-flop become reset every time a PGT at pin 71 occurs as applied at the D input of circuit 83. When the flip-flop becomes set it indicates that a very long time has occurred since the last PGT or said another way, that the Idle period is very long and that it is time to shut down the RTU. An exemplary count, when such condition occurs, is $2^{12}$ or roughtly 40 T. When the flip-flop becomes set, an LL 0 signal from output S1 blocks gates 81 and thereby prevents clock pulses from being produced at clock out pin 75. When no clock pulses are produced the RTU goes into a low current drain state. The S1 output of shutdown circuit 83 to input R2 of reset circuit 84 sets that circuit to a ready state. The contents of reset circuit 84 is illustrated in FIG. 4 and will be described later.

The sync detector circuit 85 contains a counter of conventional design and decoder circuits of conventional design. Its operation will be described by assuming that shutdown circuit 83 has disabled the clock circuit and now a PGT (for example, PGT 100 in FIGS. 5 and 6) has occurred at pin 71 marking the start of a sync pulse. The PGT resets the flip-flop in shutdown circuit 83 resulting in gate 81 becoming enabled which results in clock pulses being produced at pin 75. In a manner to be described hereinafter reset circuit 84 produces, in response to PGT 100, an LL 1 pulse on output S7 lasting until NGT 102. As a result of PGT 100 a momentary LL 1 pulse is produced at the S3 output of edge detector 82 which combines with the LL 1 from output S5 from reset circuit 84 in AND gate 128 to produce a momentary LL 1 reset pulse at S6 to reset the counter in sync detector 85. Concurrently, the LL 1 pulse from the S7 output of reset circuit 84 enables the counter in sync detector 85 to begin counting clock pulses from clock out pin 75.

Since the precise length in time of the sync pulse is known within the tolerance of oscillator 52 and since the frequency of the clock pulses of clock out pin 75 is known to be greater than some minimum value and less than some maximum value, a count in the counter of sync detector 85 less than some value X when NGT 102 occurs means that NGT 102 does not mark the end of a sync pulse. Likewise, if the count in sync detector 85 is greater than some other value Y when NGT 102 occurs, the pulse cannot be a sync pulse since it is too long in time. If the NGT 102 occurs within the window between X and Y, the pulse is presumably a sync pulse. These low and high values X and Y are built into the decoding circuit in sync detector 85. Thus, following the beginning of the enable pulse at the E input of sync detector 85 until a count of X is reached, or after a count of Y is reached, an LL 1 pulse is produced at output S9 which causes OR gate 88 to produce a default pulse to place reset circuit 84 in a ready state.

If NGT 102 is produced between a count of X and Y, the resulting pulse from the S2 output of edge detector 82 causes reset circuit 84 to remove the enable pulse from the E input of sync detector 85 and thus lock in sync detector 85 the count it then contains. That count Z is equal to or corresponds to the number of clock out pin 75 pulses produced in $2\frac{2}{3}$ T and may be a relatively high number or a relatively low number depending on the frequency of the clock out pin 75 pulses. The number needed by prescaler 86 (to be described hereinafter) is not the number of clock pulses corresponding to $2\frac{2}{3}$ T but rather the number of clock pulses corresponding to $T \div 6$. Conveniently, the total division is 16 (1 divided by $2\frac{2}{3}$ divided by 6) which in the binary system is represented by 4 bits. Therefore, the division is effected by not connecting the least significant 4 bits of the sync detector counter to prescaler 86.

Prescaler 86 contains a counter and a comparator each of conventional design. The comparator is responsive to the prescaler counter and to the count corresponding to $T \div 6$ on the S10 line from sync detector 85 for producing a pulse on the S11 output line whenever a comparison occurs. The counter is prescaler 86 is reset by each NGT at the R input of prescaler 86 and counts at a rate determined by the clock pulses at clock out pin 75. When the count in the counter reaches a count corresponding to $T \div 6$ at whatever rate pulses are being produced at clock out pin 75, prescaler 86 produces a momentary pulse at output terminal S11 and clears its internal counter to begin counting anew to a count corresponding to T÷6 at which time a new pulse appears at output pin S11 and the process repeats.

Eventually, an NGT is received at pin 71. The resulting pulse from output S2 of edge detector 82 resets the counter in prescaler 86. If the output at clock output pin 75 remains stable, the counter in prescaler 86 should have counted up to its preset value six times since the last NGT at pin 71 and be resetting on its own. Such is not likely to be the case in the real world. Thus, the reset pulse from output S2 of edge detector 82 is utilized.

Timing circuit 87 comprises essentially a counter which counts pulses from the S11 output of prescaler 86 and is reset by a pulse from output S2 of edge detector 82 resulting from an NGT at pin 71 or a reset pulse from reset circuit 84. When timing circuit 87 is reset from output S2 of edge detector 82 marking an NGT it produces a pulse at output T00. The second pulse thereafter from S11 causes an output at T10 marking $\frac{1}{3}$ T since the last NGT. The third pulse from output S11 causes an output at T11 marking $\frac{1}{2}$ T since the last NGT. The fourth output pulse from S11 causes an output at T20 marking $\frac{2}{3}$ T since the last NGT. The fifth output pulse from S11 causes an output at T21 marking 5/6 T since the last NGT. As the sixth pulse at output S11 occurs an NGT should occur at pin 71. If it does, the resulting pulse from the S2 output of edge detector 82 resets the counter in timing circuit 87 as well as the counter in prescaler 86 and the above-described process repeats. However, if for some reason an NGT does not occur, timing circuit 87 continues to be receptive of output pulses from S11 and at the 12th such pulse produces an output at T60 equivalent to 2 T. This output pulse marks an error condition and is input to OR gate 88 for purposes to be hereinafter described.

Bit pointer 90 comprises essentially a counter which receives a reset pulse from reset circuit 84 at its R input and remains in a reset condition until an NGT marking the trailing edge of a sync pulse, such as NGT 102, (FIG. 5) is received at pin 71 at which time the reset pulse is removed from bit pointer 90. The bit pointer counter 90 is advanced at its C input by pulses at output S2 of edge detector 82 caused by NGT's at pin 71 starting with NGT 102 (FIG. 5). Its purpose is to direct data received at pin 71 into the address latch 91 and data latch 92 in order. That is, the first four NGT's at pin 71 beginning with the NGT marking the trailing edge of the sync pulse cause bit pointer 90 to advance through Y counts (1 to 4, for example) to direct the four bits comprising the address of the message into the D input of address latch 91. The next 16 NGT's at pin 71 cause bit pointer 90 to advance through 16 more counts (counts of 5–20 for example) to direct the 16 data bits (FIG. 5), or such of the data bits as are being input to the RTU as received at the D input of data latch 92, to be stored in respective positions therein. The 21st NGT causes bit pointer 90 to produce a reset LL 1 pulse at output S13 which is applied to gate 88.

Address latch 91 comprises four storage registers and a comparator. If the address input to address latch 91 at input D under control of bit pointer 90 compares identically with the address prewired in pins 76, no error condition is produced. If the input bits do not agree with the prewired bits, an LL 1 error pulse is produced at output S14 of address latch 91.

Data latch 92 comprises 16 registers which are capable of storing information either received at the D input or from I/O pins 77, depending on the count in bit pointer 90 and the setting of mode circuit 93 under control of mode pins 78. With the exemplary situation illustrated in FIG. 5, that is, where eight data bits are received from the MCU and eight additional data bits are input at I/O pins 77, the first eight bits are latched into respective registers in data latch 92 under control of bit pointer 90 and mode control 93 which receives count information from bit pointer 90 as indicated by arrow 99. The second eight bits are input to pins 77 from various devices such as switches, sensors, and so forth (not shown).

Mode circuit 93 is comprised essentially of a conventional decoder (not shown) and some gates. The gates are responsive to the wired signals at pins 78 which are determinative of how many bit positions in data latch 92 are for input from pin 71 and how many are for output to pin 70. The decoder is responsive to signals from the gates and from bit pointer 90 and establishes data direction (either input or output) at IO pins 77, under control of signals going from mode circuit 93 to data latch 92 via conductors 170. The data is transmitted out of data latch 92 at output S15. The transmit (XMT) signal from output S16 of mode circuit 93 directs when data is to be accepted by modulator 89 for transmission to the MCU 12.

Modulator 89 comprises a plurality of gates receptive of timing signals from timing circuit 87, data from output S15 of data latch 92 and the transmit signal from output S16 of mode circuit 93 to provide properly timed data signals at multiplex bus out pin 70. The exact shape of the signals will be described hereinafter.

The contents of reset circuit 84 are illustrated in detail in FIG. 4 to which attention is now directed. In FIG. 4 the small boxes with letters, or letters and numbers, correspond to the same markings of the reset circuit in FIG. 3. That is, for example, box 110 marked R1 corresponds to input R1 of reset circuit 84, FIG. 3. R1 and the output of AND gate 112 are connected to respective inputs of an OR gate 114. The output of OR gate 114 is connected to the D input of a D-type flip-flop 116 also denoted FF1. Terminal R2 is connected via inverter 117 to the set (S) input of flip-flop 116 and to the S input of an identical D-type flip-flop 118. Terminal C is connected to the C (clock) inputs of flip-flops 116 and 118. The D input terminal is connected to one input of a NAND gate 120 to one input of an AND gate 122 and to one input of a NOR gate 124. The Q output of flip-flop 116 and the output of NOR gate 124 are connected to the two inputs of AND gate 112.

The $\overline{Q}$ output of flip-flop 116 is connected to the second input of NAND gate 120. The output of NAND gate 120 and AND gate 122 are connected as inputs to OR gate 126. The output of OR gate 126 is connected to the D input of flip-flop 118. The Q output of flip-flop 118 is connected to output terminal S5, to one input terminal of NOR gate 124 and to one input of AND gate 122. The output of AND gate 122 is connected to output terminal S7.

Operation of reset circuit 84, FIG. 4 will be described in connection with the waveforms of FIG. 8 which depict voltage levels at various points in reset circuit 84 on the vertical axis with time on the horizontal axis. Its operation will be described starting with the assumption that bit pointer 90 (FIG. 3) has just produced a LL 1 pulse on its S13 output which, in turn, causes OR gate 88 to produce a default output LL1 pulse which is applied to the R1 input of reset circuit 84 (pulse 810 on the R1 line, in FIG. 8). This pulse causes flip-flop 116 to become set (Q output is on LL1) at the next clock pulse (from pin 75, FIG. 3) appearing at terminal C of reset circuit 84.

When flip-flop 116 becomes set, its $\overline{Q}$ output is an LL 0 placing an LL 0 signal on NAND gate 120. At that time the D input terminal is also low since, as is indicated from the D line in FIG. 8, an idle condition is occurring. The resulting two LL 0 signals at NAND gate 120 cause it to produce an LL 1 output signal which, via OR gate 126, is applied to the D input of flip-flop 118 causing it to become set. As a result, the Q output thereof is at an LL1 and therefore the S5 output is an LL1. Although it is not illustrated in the waveforms of FIG. 8, if the S13 signal were not produced by bit pointer 90, in due course an LL0 output pulse would be produced at the S1 output of shutdown circuit 83 (FIG. 3) which would be applied to the R2 input terminal of reset circuit 84. That signal via inverter 117 would also set flip-flops 116 and 118 directly via their S inputs. In any event, thereafter the PGT 812 on line D (FIG. 8), marking the end of the Idle period, after a very short delay due to circuit components causes sync detector 85 (FIG. 3) to produce an LL1 pulse on its S9 output as indicated on the R1 line of FIG. 8.

Just as PGT 812 occurs, the resulting LL 1 signals at NOR gate 124 (it will be remembered that the Q output of flip-flop 118 is at an LL 1) causes an LL 0 signal to be applied to AND gate 112 and thence to OR gate 114 resulting in an LL 0 signal being applied to flip-flop 116. This results in a very momentary change of state of flip-flop 116 from a set to a reset condition as marked by pulse 814 waveform F1. Immediately thereafter the LL 1 pulse at S9 occurs once again setting flip-flop 116.

When the NGT 816 occurs at input R1, no LL 1 is present at OR gate 114 to maintain flip-flop 116 in its set condition. Therefore, with the LL 0 being produced by OR gate 114, flip-flop 116 becomes reset and when the flip-flop becomes reset the Q output thereof goes to an LL 0 as indicated by NGT 818 of waveform F1. Flip-flop 118, however, continues to remain set and therefore the Q output thereof and therefore the S5 output of the circuit remains at an LL 1. As a result of the NGT 824 marking the end of the sync pulse, an LL 0 signal is applied to AND gate 122. The resulting LL 0 output applied to OR gate 126 along with the LL 0 signal applied from NAND gate 120 causes flip-flop 118 to become reset and thereby causing the S5 signal to go to an LL 0. The LL 0 from AND gate 122 causes the S7 output to also go to an LL 0, removing the enable pulse from sync detector 85 (FIG. 3).

If it is assumed for a moment that NGT 824 marking the termination of the sync pulse did not occur, eventually sync detector 85 (FIG. 3) would again produce an LL 1 signal at its S9 output as indicated in phantom at FIG. 8 waveform R1, following PGT 826. Should this occur, flip-flop 1 would once again be set via OR gate 114. Since no NGT has occurred, flip-flop 118 remains set and therefore LL 1 signals appear at outputs S5 and S7. It will be understood that eventually an NGT 824 will occur. But if when it occurs flip-flop 116 is set as is the case since NGT 826 occurred, the pulse is not treated as a sync pulse but rather treated as an error pulse and nothing occurs in any of the circuitry of FIG. 3 until the next PGT comes along, the results of which will be described in more detail hereinafter.

Next it will be assumed that for some reason a message did not have an NGT occur at a proper time during the address or data portion of the message (see FIG. 5). In such case timing circuit 87 will produce a pulse T60 as indicated by pulse 830, waveform R1 of FIG. 8. The LL 1 pulse 830 causes flip-flop 116 to become set via OR gate 114. The next NGT 832 at the D input, whether it is the beginning of idle or anything else, results in the termination of signal T60 from timing circuit 87. The LL 0 signal at the D input following NGT 832 results in two LL 0 signals being applied to NAND gate 120 causing it to produce an LL 1 output signal which via OR gate 126 sets flip-flop 118. In all other respects, operation of the reset circuit is as previously described.

Operation of the entire multiplex bus system will be described after a description of the data signal is given. With reference to the waveforms of FIG. 7, particularly the top three, namely Bus In, Bus Out and Bus Combined, three successive data bits are illustrated. Bus In illustrates, for example, the inbound signal at multiplex Bus In pin 71 in FIG. 3. Bus Out illustrates the outbound signal at pin 70 in FIG. 3 while Bus Combined represents the combination of Bus In and Bus Out signals as they would appear on any of the data busses 14 in FIG. 1. Each data bit is of duration T. Each data bit begins with an NGT such as 700 and ends with an NGT such as 702 which is also the beginning of the next data bit. It will be noted that the last (sixteenth) data bit does not need the ending NGT (FIG. 5). Thus, one data bit extends from NGT 700 to NGT 702, the next data bit extends from NGT 702 to NGT 704 and third bit extends from NGT 704 to NGT 706. Each data bit has a PGT such as 708 intermediate the two NGT's and the timing of that PGT relative to the NGT's determines whether the bit represents a Zero or a One. The terms Zero and One will be used to distinguish from LL 0 and LL 1 voltage levels used elsewhere to describe the operation of the multiplex bus system hardware.

The PGT occurs T/3 from one or the other NGT delimiting the data bit. If the PGT occurs T/3 from the second NGT, it will be arbitrarily assumed to be a data bit Zero. The data extending between NGT 700 and 702 is thus a Zero. If the PGT is T/3 from the first NGT, a One is assumed. PGT 710 in the Bus Combined waveform combined with NGT 704 and 706 is a One.

The description of the data bits to this point also applies to address bits from MCU 12 to any RTU 16.

It will be understood from an earlier description that a typical RTU is electronically arranged to receive X data bits from the MCU and to transmit Y data bits to the MCU where the total of X and Y is sixteen. Data bits transmitted from the MCU to the RTU consist of LL O portions such as the portion from NGT 700 to the PGT 708 and LL 1 portions such as the portion from PGT 708 to NGT 702. Where a data bit is to be transmitted from a RTU 16 to the MCU 12, the MCU still transmits all NGT's and T/4 of signal thereafter and therebefore. The data bit extending between NGT 702 and NGT 704 is one example. Thus, NGT 702 and the next T/4 LL O is transmitted from the MCU to the RTU. Also NGT 704 and the preceding T/4 LL 1 is transmitted from the MCU to the RTU. The central 2T/4 represents a high impedance output from the MCU I/O driver 62 in FIG. 2, being neither an LL 1 nor an LL O.

Figure 7:
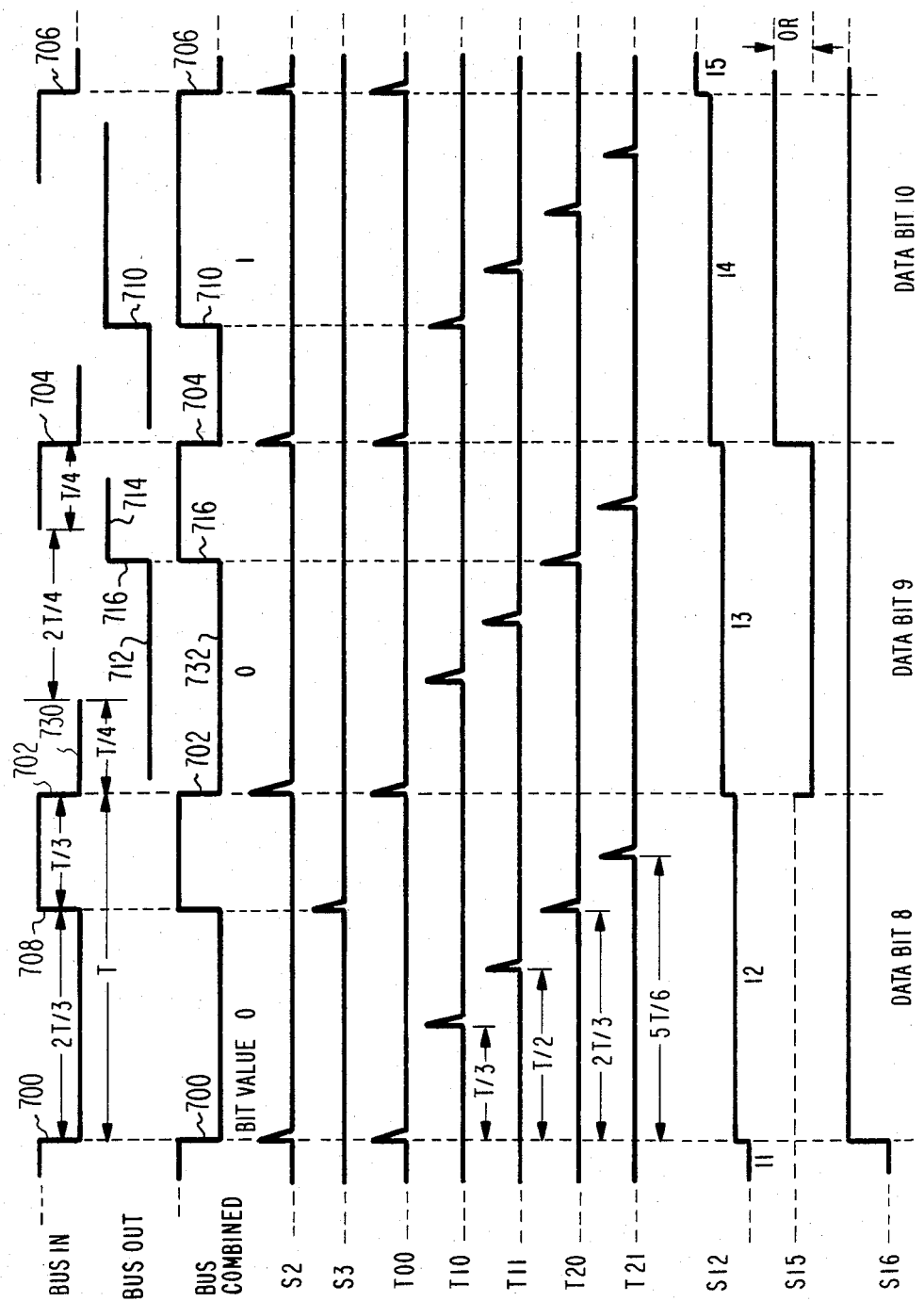

Under control of timing circuit 87 and modulator 89, FIG. 3, the RTU supplies on Bus Out pin 70 the missing data portions as illustrated in the Bus Out waveform of FIG. 7. These data portions also begin as LL O (see for example, segment 712) and end as LL 1 (see for example, segment 714). As above described, the timing of the PGT determines whether the data bit is a One or a Zero. PGT 710 defines a One and PGT 716 defines a Zero. The signal produced on pin 70, FIG. 3, begins immediately following pulse TOO from timing circuit 87 and ends at pulse T21. At all other times the output of modulator 89 is a high impedance.

With respect to FIG. 3, it will be remembered that TOO is produced as a result of the pulse from output S2 of edge detector 82 and T21 is produced 5T/6 later. Output S2 occurs as each NGT is received at edge detector 82. The timing of the signals produced in modulator 89 is such that the signal overlaps with the signal received from the MCU. The overlap of the LL O portion of the signal is substantially T/4. The overlap of the LL 1 portion is 5T/6−3T/4=T/12. As such the signals on all data bus 14's, FIG. 1, should never be in a high impedance state.

Overall systems operation is as follows. With respect to FIG. 1, the MCU 12 may be designed to transmit messages concurrently on one or more than one (including all) data busses 14-1 through 14-4 depending on the complexity of the MCU. With respect to each data bus, however, transmission to the various RTU's 16 attached thereto is in series. Each RTU on a given data bus is given a unique address by virtue of wiring four address pins 76 (FIG. 3) to a combination of voltage values representing Ones and Zeros. There are thus sixteen uniquely addressable RTU's on each data bus.

Further, the two mode pins 78 (FIG. 3) of each RTU are wired to a combination of voltage values representing Ones and Zeros to determine the number of the sixteen data bits (if any) which are transmitted from the MCU to a particular RTU and the number of data bits which are transmitted from the RTU to the MCU. It will be assumed that an exemplary RTU is wired to receive eight data bits from the MCU 12 and to transmit thereto eight data bits to be consistent with the waveforms of FIGS. 5 and 6.

As a starting point and with reference to FIG. 3 it will be assumed that the bus signal on any bus 14 has been in an Idle state for a very long time such that shutdown circuit 83 has timed out and is producing an LL O signal at its S1 output. Therefore, gate 81 is disabled an no clock pulses are produced at pin 75. Further, either an LL1 pulse from gate 88 applied to the R1 input of reset circuit 84 or the LL O from output S1 of shut down circuit 83 applied to the R2 input of reset circuit 84 and inverted to an LL 1 by an inverter 117 causes both flip-flops 116 and 118 to be set and causes S5 to be at LL 1. See FIG. 4. Next it will be assumed that the message illustrated in FIG. 5 is transmitted from MCU 12 to a RTU 16 over bus 14.

The first PGT thereof, 100 in FIG. 6, applied at input D of shutdown circuit 83 resets it causing S1 thereof to change to an LL 1. The LL 1 from output S1 enables gate 81 to begin producing clock pulses nominally at the rate of 96 per time T (T is typically one millisecond and the clock rate is 96 kilohertz) but which due to environmental variations and component tolerances can range from 48 per T to 384 per T. With reference to FIG. 4, the LL 1 from inverter 117 resulting from the LL0 previously applied at input R2 of reset circuit 84 had set flip-flops 116 and 118 thereof which remain set when PGT 100 occurred. As a result output S5 is set to an LL 1. PGT 100 (FIG. 6) causes the S3 output of edge detector 82 (FIG. 3) to produce a momentary LL 1 pulse (FIG. 6 pulse 610) which is applied to an input of AND gate 128. The LL 1 signal from the S5 output of reset circuit 84 and the momentary LL 1 pulse from S3 combine on AND gate 128 to produce a momentary output pulse on output S6 (FIG. 6, pulse 612). Also the LL 1 signal from the Q output of flip-flop 118 and the LL 1 of the message from RTU 12 following PGT 100 (FIG. 6) (which is the same as PGT 812, (FIG. 8)) as applied to the D input of reset circuit 84 combine at AND gate 122 thereof to produce an LL 1 output pulse at S7.

Returning to FIG. 3, the momentary LL 1 pulse at output S6 of AND gate 128 applied to the R input of sync detector 85 resets it and the LL 1 signal from output S7 applied to the E input of sync detector 85 enables its counter to begin counting clock pulses from clock out pin 75. It will be recalled from an earlier description of sync detector 85 that when it is at its low initial counts, an LL 1 error signal is produced at output S9 which via OR gate 88 is applied to the R1 input of reset circuit 84. As the count in sync detector 85 increases beyond some known minimum value (counts below that minimum value being less than could possibly be the result of a valid sync pulse) the S9 output changes to an LL 0 causing flip-flop 116 to be reset. Flip-flop 116 becomes reset because, when the LL 1 S9 signal is no longer present, gate 114 has two LL 0 signals applied thereto and thus flip-flop 116 is reset.

The counting of clock pulses in sync detector 85 continues until NGT 102 (FIG. 6) occurs marking the end of the sync pulse portion of the message.

Returning for a moment to FIGS. 4 and 8, when the message signal changes to an LL 0 following NGT 102, the resulting LL 0 signal via input D at gate 122 in combination with the next clock pulse at the C input of flip-flop 118 causes flip-flop 118 to be reset. It will be noted that since flip-flop 116 was earlier reset, the resulting LL 1 at the $\overline{Q}$ output thereof blocks gate 120 which could otherwise produce an LL 1 to keep flip-flop 118 set. With flip-flop 118 reset the S7 output of reset circuit 84 changes to an LL 0 and stays at LL 0 until the end of the message.

Returning to FIG. 3, when S7 returns to an LL 0 the enable pulse is removed from sync detector 85 and it is thus storing in its circuit the number of clock pulses produced from clock pin out 75 during the time of a message sync pulse. The length of that sync pulse is very precisely determined by crystal 52 (FIG. 2) and is, for example, $2\frac{2}{3}$ T. Thus, if gate 81 is producing clock pulses at is nominal rate, sync detector 85 is storing a count of 96·$2\frac{2}{3}$ or 256. Sync detector 85 is assumed to be one which performs a prescaler function. Thus it effectively divides that number by $2\frac{2}{3}$, thus storing a count of 96. For the sake of the following description, it will be assumed that the clock is running at a lower than normal frequency so that 60 clock pulses correspond to time T and therefore the number 60 is stored in sync detector 85.

Prescaler 86 and timing circuit 87 are reset by each NGT at the R and R1 inputs, respectively, including NGT 102, FIG. 6. (It will be realized that the actual reset pulse is from the S2 output of edge detector 82 but those pulses are generated as a result of NGT's. Prescaler 86 divides whatever count is in sync detector 85 by either 6·$2\frac{2}{3}$ if no prescaling is done in sync detector 85 or otherwise by 6.

In the exemplary system where a count of 60 represents T, prescaler 86 produces an output pulse on output S11 for every ten clock pulses it receives at the C input. NGT 102 causes bit pointer 90 to advance to the count of the first address location in address latch 91 a count of one, for example, which is produced on its S12 output.

Following NGT 102 timing circuit 87 produces a T11 pulse at T/2. The T00, T10, T20 and T21 pulses are also produced but are of no significance at the present time. The T11 pulse gates the logic level present at Multiplex Bus In pin 71 into the address latch location determined by bit pointer 90. In this case an LL 1 representing a One in the message of FIGS. 5 and 6 (see FIG. 6, Bus In, location 614) is gated into address latch location 1.

The next NGT (616 in FIG. 6) via output S2 of edge detector 82 again resets prescaler 86 timing circuit 87 and bit pointer 90 to the next count, 2. At T/2 thereafter, the T11 pulse clocks into address location 2 the value then present on pin 71, a LL 0 representing a Zero in the exemplary message.

Assuming temporarily that the second address bit as set in address latch 91 via pins 76 is not a Zero but rather a One then the message is not intended for this particular RTU 16. In that case following the receipt of the full address an error pulse is produced at the S14 output of address latch 91 causing a reset LL 1 pulse at the R1 input of reset circuit 84. With reference to FIG. 4 the pulse at R1 sets flip-flop 116. With flip-flop 116 set, the LL0 signal at Multiplex Bus In pin 71, FIG. 3, following the next NGT (marking the start of data bit 1) combines with the LL 0 at the $\overline{Q}$ output of flip-flop 116 to enable NAND gate 120 to set flip-flop 118 causing it to generate a general reset signal on output S5. Therefore, RTU 16 again looks for a sync pulse. The PGT's marking the various data bits will be treated by reset circuit 84 as the start of a sync pulse but the next NGT after each PGT will come so soon (either T/3 or 2T/3 later) that the S9 output pulse from sync detector 85 will be consistently present maintaining reset circuit 84 in the reset state (flip-flops 116 and 118 set) until the next true sync pulse occurs.

Returning now to FIG. 3 and assuming that the four bit address on input D to address latch 91 agrees with the address wired into pins 76, no pulse will be generated on output S14. Rather after the four address bits are loaded into the four latches of address latch 91, the first eight data bits (in FIG. 5, 1101010) will be clocked into the first eight latches of data latch 92 as addressed by bit pointer 90 on lines S12 just as described for the address bits.

Waveforms relating to data bits 8, 9 and 10 are illustrated in FIG. 7 which in the topmost waveform thereof (Bus In) is expanded from a portion of FIG. 5. Data bits 9 and 10 and not shown bits 11–16 pertain to information received on eight of the sixteen pins 77 from outside information sources (not shown) which is being stored as binary information in eight latch locations of data latch 92 when the message being described in connection with FIGS. 5 and 6 is received from MCU 12 (FIG. 2).

When NGT 702 is received at pin 71 (FIG. 3) marking the beginning of data bit 9, bit pointer 90 is advanced to a count of 13 there having been four address bits and eight data bits transmitted to the RTU preceding the nineth data bit which is to be transmitted from RTU 16 to MCU 12. Also as with address and data bits transmitted to the RTU, prescaler 86 and timing circuit 87 are reset by NGT 702 so that accurate timing of signals transmitted from the RTU is maintained. Also when the count of thirteen (and above) is received by mode control 93 an LL 1 signal is produced at the output S16 thereof to enable modulator 89.

Upon receipt of the T00 signal from timing circuit 87 (which follows each NGT) modulator 89 produces at its output an LL 0 signal regardless of the value of data bit 9. See part 712 of Bus Out waveform in FIG. 7. At that time the Bus In signal is also at an LL 0. See part 730 of the Bus In waveform of FIG. 7. Therefore the combined signal on bus 16 as shown at Bus Combined is an LL 0. See portion 732 of the Bus Combined waveform of FIG. 7.

After portion 730 terminates (that is MCU 12 produces a high impedance on bus 14) portion 712 continues and since in the example of FIG. 7 a data Zero is being transmitted on line S15 to modulator 89, the LL 0 output of modulator 89 continues until 2T/3 after NGT 702 is received at pin 71. At that time T20 from TC 87 causes modulator 89 to produce PGT 716 and thereafter to produce an LL 1 as illustrated in waveform portion 714. The LL 1 continues until T21 is produced at 5T/6 after NGT 702 at which time modulator 89 returns to a high impedance state at its output. At 3T/4 MCU 12 changes from a high impedance state to an LL 1. The Bus Combined signal on bus 14 is therefore at an LL 1 for T/3 after PGT 716 to NGT 704.

As mentioned earlier the timing of signals sent to RTU 16 from MCU 12 is very accurate but the clock pulses produced at clock out pin 75 are subject to variation. If, for example, after sync detector 85 and prescaler 86 determine the number of clock pulses per time T, the pulses should for some reason slow down (frequency decrease) by the time the ninth data bit is reached then pulses T20 and T21 lengthen to greater than 2T/3 and 5T/6, respectively. Nevertheless, so long as pulse T20 occurs at or before 3T/4 when MCU 12 ceases to transmit the LL 1 pulse prior to NGT 704 and so long as pulse T21 occurs before NGT 704, system operation will be proper. Conversely, if after sync detector 85 and prescaler 86 determine the number of clock pulses per time T the pulse rate should increase (frequency increase) by the time the ninth data bit is present then pulses T20 and T21 would shorten to become less than 2T/3 and 5T/6, respectively. That case is similar to the previous case so long as pulse T20 occurs no earlier than T/2 such that it is possible to distinguish a data Zero from a data One and so long as pulse T21 occurs not later than 3T/4 system operation will again be proper.

The operation with regard to data bit 10 is the same as for data bit 9 except that since data bit 10 is a One, modulator 89 transitions from an LL 0 to an LL 1 at PGT 710, T/3 after the NGT 704 marking the start of data bit 10, rather than ⅔T as was the case with data bit 9.

Transmission of the remaining data bits 11–16 although not shown is as described for the transmission of data bits 9 and 10. When the NGT marking the trailing edge of the sixteenth bit is transmitted from MCU 12 to RTU 16 as being NGT 510 in FIG. 5, that NGT 510 via edge detector 82 causes bit pointer 90 to count to its next value, that is a count of 21. That count of 21 causes an LL 1 pulse to be produced on the S13 output of bit pointer 90 which causes an LL 1 signal to be applied to the R1 input of reset circuit 84. In the absence of NGT 510, that is with an LL 1 idle as illustrated in phantom in FIG. 5, pulse T60 is eventually produced from timing circuit 87 and applied to the R1 input of reset circuit 84. As illustrated in the various waveforms of FIG. 8, the pulse at R1 causes flip-flops 116 and 118 to become set causing, in turn, those actions to occur which have been earlier described.

With reference to FIG. 2 the eight data bits transmitted to MCU 12 from RTU 16 are received in I/O buffers 62 as described in connection with the operation of RTU 16. MCU 12 tests the level of signal at the multiplex bus line at T/2 following the NGT (FIG. 5) marking the start of each received data bit. If the data bit is at an LL 0, then a Zero is assumed and an indication thereof is stored in RAM 58. Conversely, if at T/2 following an NGT, an LL 1 is present on the bus line, a One is assumed and an indication thereof is stored in RAM 58 all under control of microprocessor 54.

The microprocessor is programmed to know which specific RTU 16 it is connected with and to known which specific data position it is dealing with as the incoming data bits are received from the RTU and it is further programmed to know which RTU and which specific data position therein is to receive, in a subsequent message, each specific bit of information received in the message just described. Even if the data bit sending device, a headlight switch, for example, and a data bit receiving device, headlights, for example, are connected to the same RTU, the described message transmission procedure would still apply. That is, during the course of a first message transmission a data bit is transmitted from RTU 16 to MCU 12 indicating that the headlight switch has been turned on. The data bit is stored in a predetermined location in RAM 58. During a subsequent message at a predetermined time location therein a data bit is transmitted from the MCU to the RTU which is stored in a given latch position of data latch 92 (FIG. 3) which is connected to the headlight relay causing the headlights to be illuminated. This process is very fast, on the order of 25 milliseconds so it appears that the headlights are illuminated the instant that the headlight switch is turned on.

What is claimed is:

1. A multiplex bus system comprising in combination:
   a master control unit (MCU) including a signal producing first clock source;
   at least one receiver-transmit unit (RTU) including a signal producing second clock source;
   bus means connecting said MCU and said at least one RTU for facilitating the transmission of information-bearing signals therebetween;
   wherein said MCU transmits signals via said bus means to said RTU in the form of messages, each message comprising a synchronization pulse of known duration XT and a plurality of data bits of known duration T, wherein each of said messages includes a portion for the transmission of data bits from said RTU to said MCU;
   said MCU including means utilizing said first clock source signal for determining said duration T;
   said RTU including means responsive to the duration of said synchronization signal and to said second clock source signal for producing a signal representing said duration T as a function of said second clock source frequency; and
   said RTU including means utilizing said signal representing said duration T for thereafter clocking said data bits from said MCU to said RTU into said RTU.

2. The combination as set forth in claim 1 wherein said MCU includes means for generating a signal representing said data bits and wherein the signal for each data bit comprises first and second transitions from a first voltage level to a second voltage level and spaced time duration T apart and wherein the second transition of one data bit is the first transition of a next successive data bit and wherein said signal representing each data bit transmitted from said MCU to said RTU comprises a third transition from said second voltage level to said first voltage level and occurring intermediate said first and second transitions and nearer in time to the occurrence of said first or second transition depending on whether the data bit has a One or Zero value, said data bits representing signal including, for each data bit, a second voltage level portion existing from the occurrence of said first transition to the occurrence of said third transition and a first voltage level portion existing from the occurrence of said third transition to the occurrence of said second transition.

3. The combination as set forth in claim 2 wherein for said data bits to be transmitted from said RTU to said MCU during the transmission of said message, said RTU includes means for generating a signal for each data bit comprising said third transition, said third transition occurring nearer in time to the occurrence of said first or second transition depending on whether the data bit has a One or Zero value, said signal also including a second voltage level portion existing from a first given time following the occurrence of said first transition until the occurrence of said third transition and a first voltage level portion existing from the occurrence of said third transition until a second given time less than the time of occurrence of said second transition, said first and second given times being a function of time T and of the frequency of said RTU clock, said signal from said MCU for data bits being transmitted from said RTU to MCU including said second voltage level signal existing from said first transition until a third given time which is at least equal to said first given time and including said first voltage level portion existing from a fourth given time no greater than said second given time from the occurrence of said second transition towards said third transition, said third and fourth times being a function of the frequency of said MCU clock.

4. The combination as set forth in claim 1 wherein said means for producing a signal representing said duration T comprises counter means responsive to the synchronization portion of said message and to said second clock source signal for counting second clock cycles during the presence of said synchronization portion and means for scaling by X the count so obtained, the scaled number corresponding to the number of clock pulse cycles in time duration T.

5. The combination as set forth in claim 3 wherein said means for producing a signal representing said duration T comprises counter means responsive to the synchronization portion of said message and to said second clock source signal for counting second clock cycles during the presence of said synchronization portion and means for scaling by X the count so obtained, the scaled number corresponding to the number of clock pulse cycles in time duration T.

6. The combination as set forth in claim 4 wherein said means for producing a signal representing said duration T further includes means for further scaling said scaled number to obtain the number of RTU clock cycles in a time duration which is a fraction Y of T and timing means responsive to the fraction Y of T time number and to each said data bit first transition for producing timing pulses every T·Y following each said data bit first transition.

7. The combination as set forth in claim 6 wherein said means for generating a signal for each data bit to be transmitted from said RTU to said MCU is responsive to said timing pulses at T·Y for determining the timing of each said third transition relative to its associated first transition.

8. A multiplex bus system for interfacing between controlled devices and controlling devices in a vehicle comprising in combination:
  a master control unit (MCU) including a signal producing first clock source;
  a plurality of receiver-transmit units (RTU's) each connected to one or more control devices for selectively passing operating power thereto and/or to one or more controlling devices for receiving signals therefrom corresponding to an action to be taken by an associated controlled device in response to a signal from a controlling device, said RTU including a second signal producing clock source;
  a bus means connected between said MCU and said RTU's for facilitating the transfer of information-bearing signals therebetween;
  wherein said MCU transmits signals via said bus means seriatim to said RTU's in the form of messages, each message comprising a synchronization pulse of known duration XT, a plurality of address bits and a plurality of data bits of duration T, said MCU including means utilizing said first clock source signal for setting said durations XT and T;
  each said RTU including means responsive to the duration of said synchronization pulse and to said second clock source signal for producing an RTU timing signal representing time duration T as a function of said second clock source frequency.

9. The combination as set forth in claim 8 wherein each said RTU includes means for presetting a unique address therein and including means responsive to the address containing portion of said message and to said RTU timing signal for decoding into One and Zero values the address portion of said message and for comparing the decoded message address with the preset address and for producing a control signal if there is a equality.

10. The combination as set forth in claim 8 wherein a said RTU includes a data storage means coupled to at least one of said controlled devices and including means responsive to said control signal, to said message signal and to said RTU timing signal for clocking said data bits received from said MCU into said data storage means for controlling said controlled device or devices coupled thereto.

11. The combination as set forth in claim 9 wherein a said RTU includes a data storage means coupled to at least one of said controlled devices and including means responsive to said control signal, to said message signal and to said RTU timing signal for clocking said data bits received from said MCU into said data storage means for controlling said controlled device or devices coupled thereto.

12. The combination as set forth in claim 8 wherein said MCU includes means for generating a signal representing said data bits and wherein the signal for each data bit comprises first and second transitions from a first voltage level to a second voltage level and spaced T apart and wherein the second transition of one data bit is the first transition of a next successive data bit and wherein said signal representing each data bit transmitted from said MCU to said RTU comprises a third transition from said second voltage level to said first voltage level and positioned intermediate said first and second transitions and closer to said first or second transition depending on whether the data bit has a One or Zero value, said data bits representing signal including a second voltage level portion extending from said first transition to said third transition and a first voltage level portion extending from said third transition to said second transition.

13. The combination as set forth in claim 12 wherein for said data bits to be transmitted from a said RTU to said MCU during the transmission of said message, said RTU includes means for generating a signal for each data bit comprising said third transition, said third transition occurring nearer in time to the occurrence of said first or second transition depending on whether the associated controlling device causes the data bit to have a One or Zero value, said signal also including a second voltage level portion existing from a first given time following the occurrence of said first transition until the occurrence of said third transition and a first voltage level portion existing from the occurrence of said third transition until a second given time less than the time of occurrence of said second transition, said first and second given times being a function of time T and of the frequency of said RTU clock, said signal from said MCU for data bits being transmitted from a said RTU to MCU including said second voltage level signal existing from said first transition until a third given time which is at least equal to said first given time and including said first voltage level portion existing from a fourth given time no greater than said second given time from the occurrence of said second transition towards said third transition, said third and fourth times being a function of the frequency of said MCU clock.

14. The combination as set forth in claim 8 wherein said means for producing a signal determining said duration T comprises counter means responsive to the sync portion of said message and to said second clock signal for counting second clock cycles during the presence of said sync portion and means for scaling by X the count so obtained, the scaled number corresponding to the number of clock pulse cycles in time duration T.

15. The combination as set forth in claim 13 wherein said means for producing a signal determining said duration T comprises counter means responsive to the sync portion of said message and to said second clock signal for counting second clock cycles during the presence of said sync portion and means for scaling by X the count so obtained, the scaled number corresponding to the number of clock pulse cycles in time duration T.

16. The combination as set forth in claim 14 wherein said means for producing a signal determining said duration T further includes means for further scaling said scaled number to obtain the number of RTU clock cycles in a time duration which is a fraction Y of T and timing means responsive to the fraction Y of T time number and to each said data bit first transition for producing timing pulses every T÷Y following each said data bit first transition.

17. The combination as set forth in claim 16 wherein said means for generating a signal for each data bit to be transmitted from said RTU to said MCU is responsive to said timing pulses at T÷Y for determining the timing of each said third transition relative to its associated first transition.

* * * * *